US009166448B2

(12) United States Patent
Lam et al.

(10) Patent No.: US 9,166,448 B2
(45) Date of Patent: Oct. 20, 2015

(54) KITCHEN APPLIANCE

(75) Inventors: Ngai Yan Lam, Hong Kong (CN); Ji Cheng Pan, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 941 days.

(21) Appl. No.: 13/112,560

(22) Filed: May 20, 2011

(65) Prior Publication Data

US 2011/0283896 A1    Nov. 24, 2011

(30) Foreign Application Priority Data

May 21, 2010    (CN) .......................... 2010 1 0181698

(51) Int. Cl.
| | |
|---|---|
| *A23G 1/10* | (2006.01) |
| *H02K 1/14* | (2006.01) |
| *A47J 43/08* | (2006.01) |
| *H02K 23/02* | (2006.01) |
| *H02K 23/40* | (2006.01) |
| *H02K 3/28* | (2006.01) |

(52) U.S. Cl.
CPC ............... *H02K 1/146* (2013.01); *A47J 43/082* (2013.01); *H02K 23/026* (2013.01); *H02K 23/40* (2013.01); *H02K 3/28* (2013.01)

(58) Field of Classification Search
CPC ....... A47J 43/082; H02K 1/146; H02K 23/40; H02K 23/026; H02K 3/28
USPC ........ 99/348, 485, 510, 511, 513; 310/50, 58, 310/152, 153, 154.31, 154.32
See application file for complete search history.

(56) References Cited

U.S. PATENT DOCUMENTS

| 1,964,265 | A | * | 6/1934 | Markley .......................... 318/123 |
|---|---|---|---|---|
| 3,733,506 | A | * | 5/1973 | Jaffe et al. ...................... 310/198 |
| 4,053,801 | A | * | 10/1977 | Ray et al. ............... 310/216.017 |
| 4,217,513 | A | * | 8/1980 | Kohzai et al. ................. 310/186 |
| 4,763,031 | A | * | 8/1988 | Wang ............................... 310/83 |
| 5,015,905 | A | * | 5/1991 | Koharagi et al. ............. 310/186 |
| 5,045,742 | A | * | 9/1991 | Armstrong et al. .... 310/216.069 |
| 5,087,845 | A | * | 2/1992 | Behrens et al. ................. 310/77 |
| 5,844,343 | A | * | 12/1998 | Horst ............................. 310/184 |
| 7,078,843 | B2 | * | 7/2006 | Du et al. ................. 310/216.091 |
| 7,557,484 | B2 | * | 7/2009 | Kawashima et al. .......... 310/225 |
| 2006/0244334 | A1 | * | 11/2006 | Furui ............................. 310/198 |
| 2007/0126310 | A1 | * | 6/2007 | Tang et al. .................... 310/216 |
| 2010/0295404 | A1 | * | 11/2010 | Li et al. ......................... 310/158 |

* cited by examiner

*Primary Examiner* — Dana Ross
*Assistant Examiner* — Joseph Iskra
(74) *Attorney, Agent, or Firm* — Muncy, Geissler, Olds & Lowe, P.C.

(57) ABSTRACT

A kitchen appliance has a base, a driven mechanism rotatable relative to the base, and an electric motor with a stator and a rotor for driving the driven mechanism. The stator comprises a stator core with two primary stator poles with stator windings wound there on and two auxiliary stator poles. The stator windings are configured in such a way that primary magnetic poles with the same polarity are formed at the primary poles and induced magnetic poles with the same polarity which is opposite to the polarity of the primary magnetic poles are formed at the auxiliary poles when the motor is electrified.

9 Claims, 3 Drawing Sheets

KITCHEN APPLIANCE

CROSS REFERENCE TO RELATED APPLICATIONS

This non-provisional patent application claims priority under 35 U.S.C. §119(a) from Patent Application No. 201010181698.3 filed in The People's Republic of China on May 21, 2010.

FIELD OF THE INVENTION

This invention relates to a kitchen appliance driven by an electric motor.

BACKGROUND OF THE INVENTION

Currently there are various kitchen appliances using electric motors. Some kitchen appliances desire the electric motor to be smaller without reducing its power. One such kitchen appliance is the food processor.

Conventionally, the food processor uses a two-pole universal motor. The stator of the motor has a stator core which includes a yoke with a rectangular configuration and two salient poles which extend inwardly from two opposing sides of the yoke and have stator windings wound thereon. When the stator windings are electrified, two magnetic poles with opposite polarity are formed at the salient poles and two magnetic circuits are formed. Each magnetic circuit passes through two stator poles, the rotor and a side of the yoke so that it has a relatively long path.

The present invention aims to provide a new kitchen appliance, especially a food processor which is permitted to be smaller and cheaper.

SUMMARY OF THE INVENTION

Accordingly, in one aspect thereof, the present invention provides a kitchen appliance comprising: a base; a driven mechanism rotatable relative to the base; and an electric motor with a stator and a rotor for driving the driven mechanism; wherein the stator comprises a stator core having a yoke which comprises at least two first sections, each with a primary pole extending there from and at least two second sections, each with an auxiliary pole extending there from, the at least two primary poles and the at least two auxiliary poles are alternately arranged in the circumferential direction of the stator core, and the at least two primary poles have stator windings wound thereon; and wherein the stator windings are configured in such a way that primary magnetic poles with the same polarity are formed at the primary poles and induced magnetic poles with the same polarity which is opposite to the polarity of the primary magnetic poles are formed at the auxiliary poles when the motor is electrified.

Preferably, the ratio of an outer diameter D of the rotor to a minimum outer dimension Y of the stator is greater than 7:10.

Preferably, the first sections are narrower than the second sections.

Preferably, there are no stator windings wound about the auxiliary poles.

Alternatively, the auxiliary poles have stator windings wound thereon, and the stator windings wound on the auxiliary poles have less turns than the stator windings wound on the primary poles.

Preferably, each of the primary poles and auxiliary poles comprises a neck extending radially inwardly from the yoke and a pole shoe extending circumferentially from the neck and having a pole face.

Preferably, the distance between the first sections and the pole faces of the primary poles are greater than the distance between the second sections and the pole faces of the auxiliary poles.

Preferably, the necks of the primary poles are narrower than the necks of the auxiliary poles.

Preferably, the motor is a single phase series motor.

According to a second aspect, the present invention provides a kitchen appliance comprising: a base; a driven mechanism rotatable relative to the base; and an electric motor with a stator and a rotor for driving the driven mechanism; wherein the stator comprises a stator core with two pairs of stator poles and stator windings wound about at least one pair of stator poles, and two pairs of magnetic poles with opposite polarity are alternatively formed at the two pairs of stator poles when the motor is electrified.

Preferably, the stator core having a yoke which comprises two first sections, each with a primary pole extended there from and two second sections each with an auxiliary pole extended there from, the two primary poles and the two auxiliary poles are alternately arranged in the circumferential direction of the stator core, and the primary poles have stator windings wound thereon; and wherein the stator windings are configured in such a way that primary magnetic poles with the same polarity are formed at the primary poles and induced magnetic poles with the same polarity which is opposite to the polarity of the primary magnetic poles are formed at the auxiliary poles when the motor is electrified.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
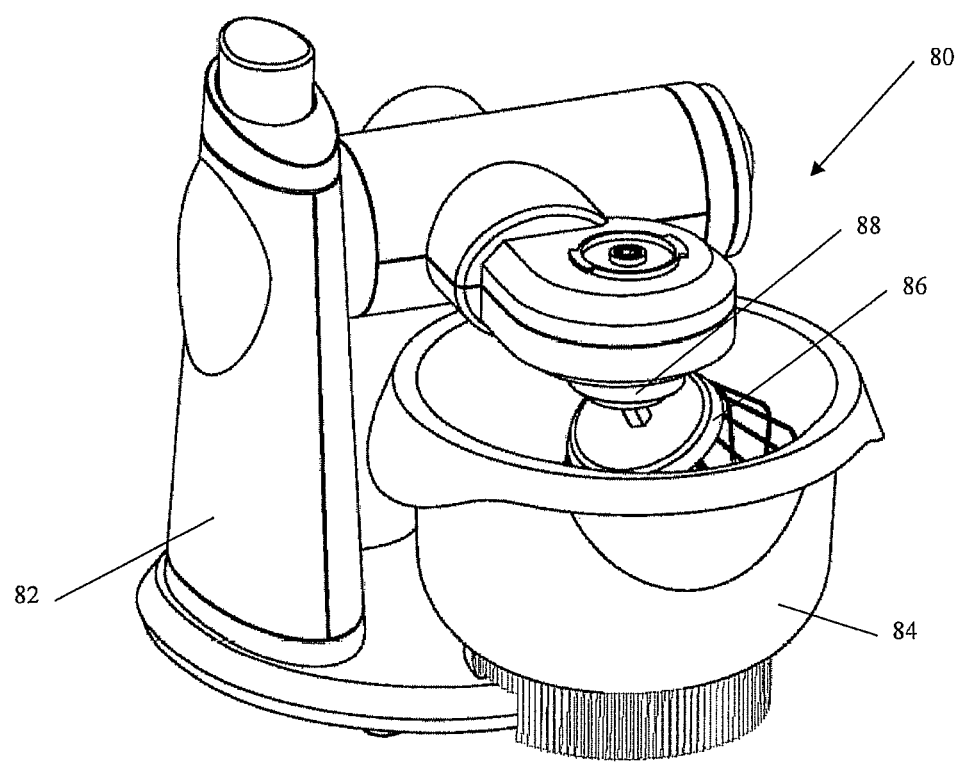
FIG. 1 is a food processor according to a preferred embodiment of the present invention.

A food processor according to a preferred embodiment of the present invention is shown in FIG. 1. The food processor 80 comprises a base 82, a container 84 fixedly or removably seated on the base 82 for containing food, an electric motor (not shown in FIG. 1), a working piece 86 for processing food in the container 84 and a coupling 88 for connecting the working piece 86 to the motor. Preferably, the working piece 86 is removably connected to the coupling 88.

Figure 2:
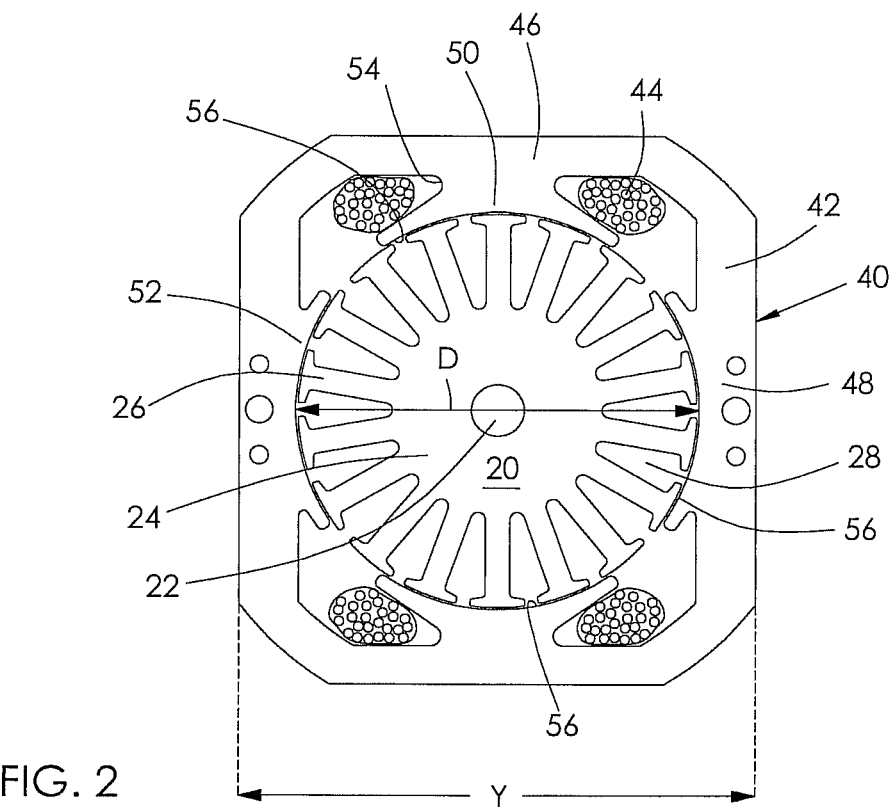
FIG. 2 is a schematic sectional view of an electric motor being part of the food processor of FIG. 1.

The electric motor is fixed within the base 110. Preferably the motor is a four-pole single phase series motor. FIG. 2 is a schematic view of a cross section of the motor, with the rotor windings omitted. The motor comprises a rotor 20 and a stator 40 magnetically coupled to the rotor 20.

The rotor 20 comprises a shaft 22, a rotor core 24 fixed on the shaft 22, and a commutator (not shown) fixed on the shaft 22 adjacent the rotor core 24. The rotor core 24 is formed by stacking laminations in the axial direction of the rotor. The rotor core 24 has a plurality of teeth 26 and rotor windings are wound about the teeth 26. A winding slot 28 is formed between each two adjacent teeth 26. The commutator has a plurality of segments. The rotor windings are wound in the winding slots 28 of the rotor core 24 and connected to the segments of the commutator.

The stator 40 comprises a stator core 42 and stator windings 44. The stator core 42 is formed by stacking laminations in the axial direction of the motor and comprises a yoke with two first sections 46 and two second sections 48. The first sections 46 and second sections 48 are alternately arranged in the circumferential direction of the stator core 42. Two primary poles 50 and two auxiliary poles 52 extend inwardly from the first sections 46 and the second sections 48 respectively. The stator windings 44 are wound about the primary poles 50, and no windings are wound on the auxiliary poles 52. The motor also has brushes fixed with respect to the stator 40 to make sliding contact with the commutator to transfer electricity to the rotor windings via the commutator. The stator core 42 is symmetrical. The primary poles 50 and auxiliary poles 52 are salient poles and each comprises a neck 54 extending radially inwardly from the yoke and a pole shoe having a pole face 56 extending circumferentially from the neck 54. Each pole face 56 forms a continuous arced surface facing the rotor 20. Together, the pole faces form an intermittent cylindrical wall.

In the circumferential direction, the necks of the primary poles 50 are narrower than the necks of the auxiliary poles 52. In the radial direction, the first sections 46 are narrower than the second sections 48, and the distance between the first sections 46 and the pole faces 56 of the primary poles 50 are greater than the distance between the second sections 48 and the pole faces 56 of the auxiliary poles 52. Thus, a larger space is formed between the first sections 46 and the primary poles 50 to accommodate the stator windings 44. It should be understood that the circumferential direction and the radial direction described above are not only for round or cylindrical structures, other shapes such as square and oval are also included within the scope of the present invention.

Figure 3:
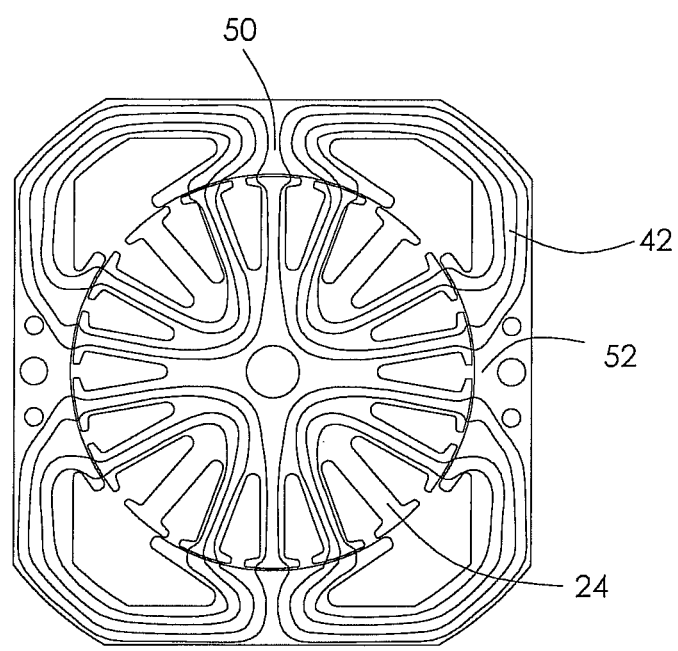
FIG. 3 is a magnetic path diagram for the motor of FIG. 2.

When the stator windings 44 are electrified, two primary magnetic poles with the same polarity are formed at the two primary poles 50 by the stator windings 44 and two induced magnetic poles with the same polarity which is opposite to the polarity of the primary magnetic poles are formed at the two auxiliary poles 52. That is, four magnetic poles and four magnetic paths are formed, as shown in FIG. 3. Each magnetic path passes through a primary pole 50, the stator yoke, an auxiliary pole 52, the air gap between the auxiliary pole 52 and the rotor 20, the rotor 20 and the air gap between the primary pole 50 and the rotor 20. Therefore the flux path is shorter than a 2 pole motor.

In the embodiment, the rotor 20 has an outer diameter D, the stator 40 has a minimum outer dimension Y, and the ratio of the outer diameter D to the minimum outer dimension Y is greater than 7:10. The outer diameter of the rotor 20 means the outer diameter of the rotor core 24. The minimum outer dimension of the stator 40 means the distance between two points of intersection between a straight line extending through the center of the stator 40 and the periphery of the stator core 42.

The outer diameter D of the rotor 20 is slightly less than the diameter of a circle defined by the arced surfaces of the pole faces of the poles 50 and 52, and the ratio of the diameter of the circle to the minimum outer diameter of the stator 40 is also greater than 7:10. It should be understandable that the width of the gap between the primary poles 50 and the rotor core 42 may be equal to or different from the width o the gap between the auxiliary poles 52 and the rotor core 42. When the two distances are different, the arced surfaces of the pole faces of the primary poles 50 and the arced surfaces of the poles faces of the auxiliary poles 52 define two circles with different diameters. In this configuration, the diameter of the circle means the diameter of the smaller circle.

In the preferred embodiment, the auxiliary poles 52 project inwardly from the inner side of the second sections 48 so as to be formed as salient poles. Alternatively, the auxiliary poles 52 may be formed as non-salient poles which are sunk relative to the inner side of the second sections 48. When the auxiliary poles 52 are salient poles, they may also have stator windings wound thereon, and the stator windings wound on the auxiliary poles 52 have less turns than the stator windings 44 wound on the primary poles 50.

On the condition of having the same output, the four-pole motor in the present invention has reduced stator windings and a smaller stator core than the two-pole motor of the conventional food processor. Therefore, the four-pole motor may be smaller and consume less material, which allows the food processor to be smaller, cheaper and lighter. Besides, the four-pole motor has less copper losses and shorter magnetic circuits, so the efficiency of the motor is improved and the energy consumed by the food processor is reduced.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, as an alternative, the container may be rotated by the motor while the coupling and the working piece are fixed relative to the base. Alternately, the food processor may be a handheld mixer without a container.

Figure 4:
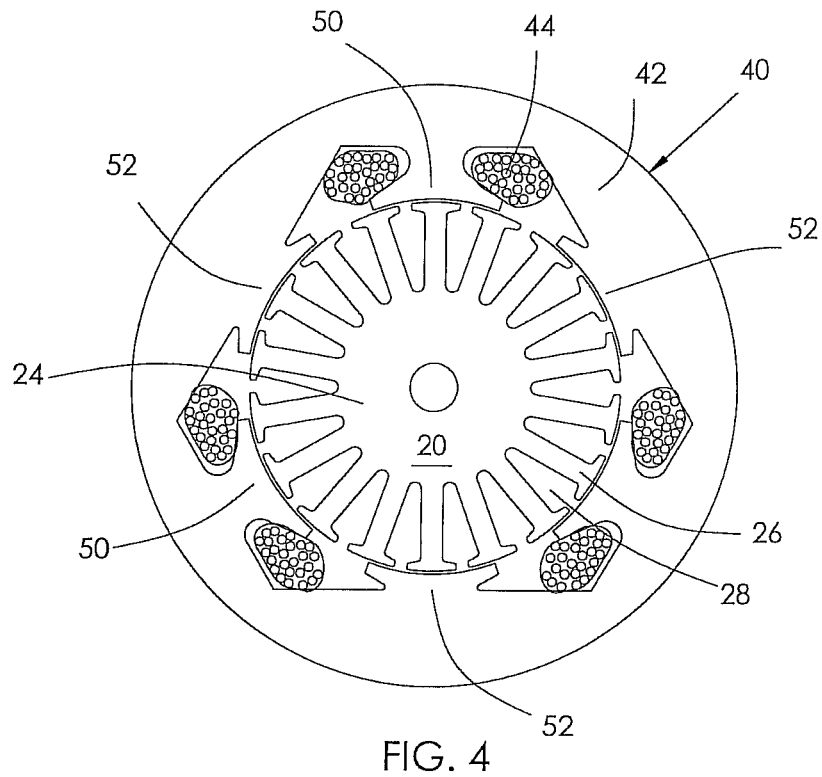
FIG. 4 is a schematic sectional view of an electric motor according to a second embodiment of the present invention.
Figure 5:
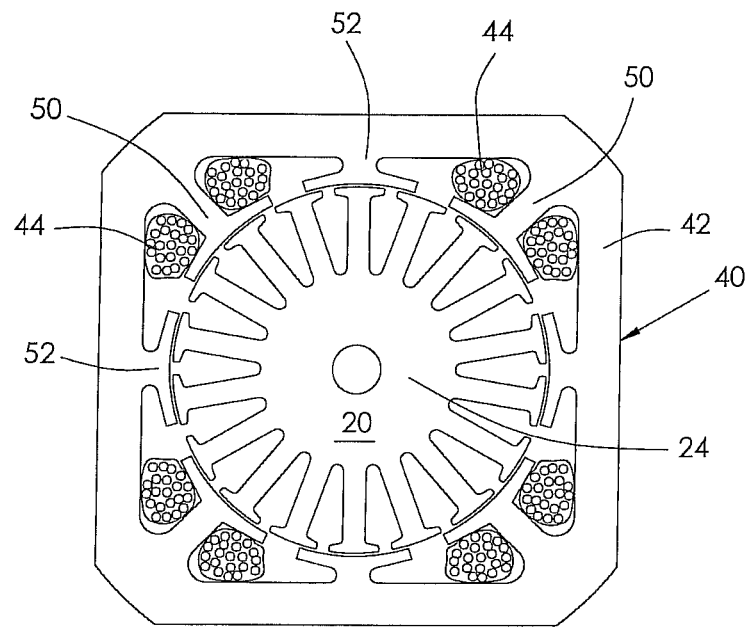
FIG. 5 is a schematic sectional view of an electric motor according to a third embodiment of the present invention.

Furthermore, the stator of the motor in the present invention may have three primary poles with stator windings wound thereon, at which three field magnetic poles are formed, and three auxiliary poles without stator windings, at which three induced magnetic poles are formed, as shown in FIG. 4. Alternatively, the stator may have four primary poles and four auxiliary poles as shown in FIG. 5.

The invention claimed is:

1. A kitchen appliance comprising:
   a base;
   a driven mechanism rotatable relative to the base; and
   an electric motor with a stator and a rotor for driving the driven mechanism;
   wherein the stator comprises a stator core with two pairs of stator poles and stator windings wound about only one pair of stator poles with the other pair of stator poles having no stator windings wound thereabout, two pairs of magnetic poles with opposite polarity are alternatively formed at the two pairs of stator poles when the motor is electrified, and all of the two pairs of magnetic poles are formed by said stator windings wound about the only one pair of stator poles.

2. The kitchen appliance of claim 1, wherein the stator core having a yoke which comprises two first sections, each with a primary pole extended there from and two second sections each with an auxiliary pole extended there from, the two primary poles and the two auxiliary poles are alternately arranged in the circumferential direction of the stator core, and the primary poles have stator windings wound thereon; and wherein the stator windings are configured in such a way that primary magnetic poles with the same polarity are formed at the primary poles and induced magnetic poles with the same polarity which is opposite to the polarity of the primary magnetic poles are formed at the auxiliary poles when the motor is electrified.

3. A kitchen appliance comprising:

a base;

a driven mechanism rotatable relative to the base; and an electric motor with a stator and a rotor for driving the driven mechanism;

wherein the stator comprises a stator core having a yoke which comprises at least two first sections, each with a primary pole extended there from and at least two second sections each with an auxiliary pole extended there from, the at least two primary poles and the at least two auxiliary poles are alternately arranged in the circumferential direction of the stator core, and the at least two primary poles have stator windings wound thereon; and wherein the stator windings are configured in such a way that primary magnetic poles with the same polarity are formed at the primary poles and induced magnetic poles with the same polarity which is opposite to the polarity of the primary magnetic poles are formed at the auxiliary poles when the motor is electrified, the induced magnetic poles at the auxiliary poles being formed by the primary magnetic poles at the primary poles;

wherein there are no stator windings wound about the auxiliary poles and all of the primary magnetic poles and the induced magnetic poles are formed by said stator windings wound on the at least two primary poles.

4. The kitchen appliance of claim 3, wherein the ratio of an outer diameter of the rotor to a minimum outer dimension of the stator is greater than 7:10.

5. The kitchen appliance of claim 3, wherein the first sections are narrower than the second sections.

6. The kitchen appliance of claim 3, wherein each of the primary poles and auxiliary poles comprises a neck extending radially inwardly from the yoke and a pole shoe extending circumferentially from the neck and having a pole face.

7. The kitchen appliance of claim 6, wherein the distance between the first sections and the pole faces of the primary poles are greater than the distance between the second sections and the pole faces of the auxiliary poles.

8. The kitchen appliance of claim 6, wherein the necks of the primary poles are narrower than the necks of the auxiliary poles.

9. The kitchen appliance of claim 3, wherein the motor is a single phase series motor.

* * * * *